United States Patent Office.

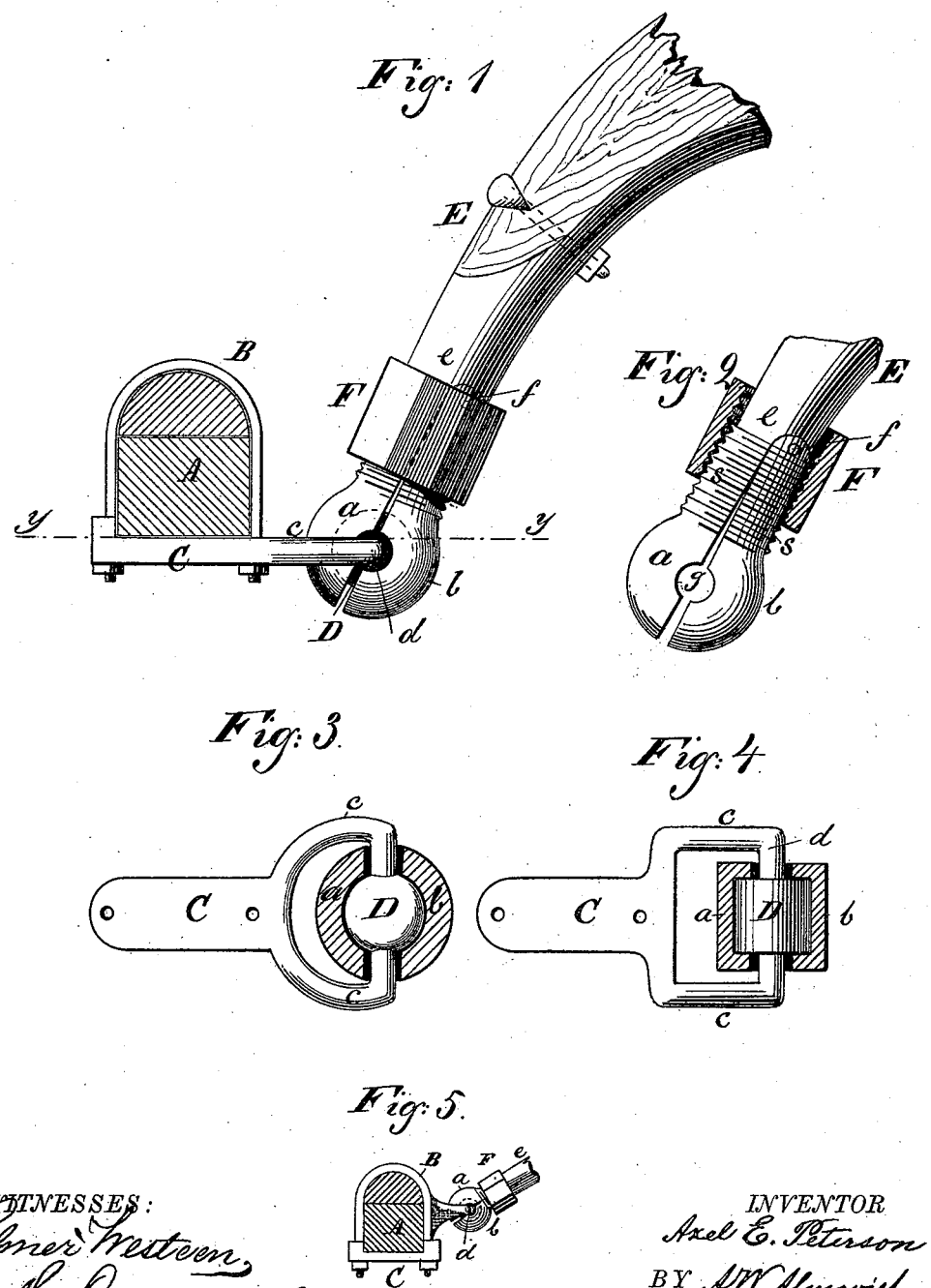

AXEL E. PETERSON, OF NEW YORK, N. Y.

THILL-COUPLING.

SPECIFICATION forming part of Letters Patent No. 361,859, dated April 26, 1887.

Application filed September 21, 1886. Serial No. 214,122. (No model.)

*To all whom it may concern:*

Be it known that I, AXEL E. PETERSON, a citizen of the United States, and a resident of New York, in the county and State of New York, have invented new and useful Improvements in Thill-Couplings, of which the following is a specification.

My invention relates to couplings for thills, poles, or shafts of vehicles, and has for its object to provide an easily attachable and adjustable coupling, which will obviate the necessity of using a packing and of repacking or replacing the same and not leave any play, consequently occasioning no noise or clatter by shaking.

The invention will be hereinafter fully described, and specifically pointed out in the claims, reference being had to the accompanying drawings, in which—

Figure 1 represents a side view of a portion of a thill and clip connected by my improved coupling, the axle of the vehicle being shown in section. Fig. 2 shows a side view of the lower or coupling end of the thill, with the adjusting-nut thereon shown in section. Fig. 3 is a horizontal section on the line $y\,y$ of Fig. 1. Fig. 4 is a similar section of a modification. Fig. 5 is a view similar to Fig. 1, showing the coupling applied to the strap, instead of to the cross-bar of the clip.

Like letters of reference indicate like parts in the several figures.

A is the axle, B the ordinary strap, and C the cross-bar of the clip. The cross-bar C is provided with two arms, $c$, connected together at their outer ends by a rod, $d$, and upon the said rod is formed an enlargement, D, which may be cylindrical, as in Fig. 4, but is preferably made spherical, as shown in Fig. 3, on account of the even distribution of the wear when the said form is used.

Instead of two arms, $c$, the bar C may be provided with one arm, on which the enlargement D is formed; but two arms are preferred, as being neater and stronger.

E is the thill or shaft, and $e$ the lower end thereof, the upper end of which is only a round bar when it comes from the factory, and is afterward shaped by the blacksmith into the form shown in the drawings. The lower end of the bar $e$ is made into the shape of a hollow sphere, one hemisphere, $a$, of which is rigid with the bar $e$, and the other hemisphere, $b$, is movably attached to it by a pivot or pin, $f$, or a spring or other flexible joint. The outer surface of the bar $e$ above the spherical end is threaded, as shown in the drawings, and a nut, F, free to slide on the bar $e$ above the threads $s$, has internal threads fitting the threads $s$. The threaded hole in the nut F is tapering, widening downward, so that the farther the nut is screwed down upon the threaded portions $s$ of the jaw $b$ and the stationary jaw $a$ of the bar $e$ the more it will compress the jaws together. The cavity in the hollow jaws is of proper size to fit the cylindrical or spherical enlargement D, respectively, so that when the jaws are applied to embrace the said enlargement D tightly, so as to occasion no play, with accompanying noise and clatter, it will at the same time allow of raising and lowering the thill, the latter moving upon the joint as a center.

As the joint of the coupling wears by use, and consequently would become loose, the play is readily taken up by simply turning the nut F down a little farther. The end holes, $g$, through which the rod $d$ passes, are made sufficiently larger than the said rod $d$ to allow for compression of the jaws upon the enlargement or ball D without contact with the bar $d$.

In couplings as heretofore constructed no enlargement upon the bar $d$ has been made, but a packing has been interposed between the coupling and the bar to prevent play and noise.

Having thus described the invention, what I claim as new, and desire to secure by Letters Patent, is—

1. In a vehicle-coupling, the combination of an axle-clip having an enlargement, D, upon its connecting-rod $d$, with a shaft having socketed and externally-threaded jaws $a\,b$, embracing the said enlargement, the jaw $a$ being fixed upon the shaft and the jaw $b$ being pivoted thereto, and a nut, F, having tapering hole and fitting the threads of the jaws for adjusting the grip of the said jaws, substantially as set forth.

2. In a vehicle-coupling, the combination of an axle-clip provided with connecting-rod $d$, with a shaft having socketed and externally-threaded jaws $a\,b$, embracing the said connecting-rod, the jaw $a$ being fixed upon the shaft and the jaw $b$ movably connected thereto, and a nut, F, fitting the threads of the jaws for adjusting the grip of the said jaws, substantially as set forth.

In testimony that I claim the foregoing as my invention I have signed my name, in presence of two witnesses, this 20th day of September, 1886.

AXEL E. PETERSON.

Witnesses:
A. W. ALMQVIST,
HELMER WESTEEN.